United States Patent
Soryal et al.

(10) Patent No.: US 11,468,158 B2
(45) Date of Patent: Oct. 11, 2022

(54) AUTHENTICATION FOR FUNCTIONS AS A SERVICE

(71) Applicant: AT&T Intellectual Property I, L.P., Atlanta, GA (US)

(72) Inventors: Joseph Soryal, Ridgewood, NY (US); Naila Jaoude, Eatontown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 188 days.

(21) Appl. No.: 16/380,026

(22) Filed: Apr. 10, 2019

(65) Prior Publication Data

US 2020/0327217 A1    Oct. 15, 2020

(51) Int. Cl.
*G06F 21/44* (2013.01)
*G06F 8/41* (2018.01)
*G06F 9/455* (2018.01)
*G06N 20/00* (2019.01)

(52) U.S. Cl.
CPC .............. *G06F 21/44* (2013.01); *G06F 8/41* (2013.01); *G06F 9/45558* (2013.01); *G06N 20/00* (2019.01); *G06F 2009/45587* (2013.01)

(58) Field of Classification Search
CPC .... G06F 9/44521; G06F 9/44526; G06F 8/40; G06F 8/41; G06F 8/427; G06F 8/423; G06F 8/43; G06F 8/447; G06F 8/54; G06F 21/30; G06F 21/45; G06F 2009/45587; G06F 21/44; G06F 9/45558; G06N 20/00
See application file for complete search history.

(56) References Cited

U.S. PATENT DOCUMENTS

| 6,161,139 | A  | 12/2000 | Win et al. |
| 7,216,110 | B1 | 5/2007 | Ogg et al. |
| 7,424,732 | B2 | 9/2008 | Matsumoto et al. |

(Continued)

FOREIGN PATENT DOCUMENTS

| CN | 101699889 A | 4/2010 |
| EP | 3396612 A1 | 10/2018 |

(Continued)

OTHER PUBLICATIONS javadoc.pdf retrieved from https://docs.oracle.com/javaee/6/api/javax/servlet/ServletRequest.html archived by the wayback machine on Feb. 22, 2017 at address: https://web.archive.org/web/20170222090527/https://docs.oracle.com/javaee/6/api/javax/servlet/ServletRequest.html.*

(Continued)

*Primary Examiner* — Richard A McCoy
(74) *Attorney, Agent, or Firm* — Guntin & Gust, PLC; Jay Anderson

(57) ABSTRACT

A machine-learning algorithm receives code indicative of a software unit and parses the code to extract an authenticating parameter. The machine-learning algorithm constructs an authentication template based on the authenticating parameter and providing the authentication template to a user. The algorithm receives user input from the user responsive to the authentication template and creates an authentication microservice based on the authentication template (and optionally the input). The algorithm links the authentication microservice to the software unit to deploy the authentication microservice within the software unit. The machine-learning algorithm is then modified based on the input.

13 Claims, 3 Drawing Sheets

(56) References Cited

U.S. PATENT DOCUMENTS

| | | | |
|---|---|---|---|
| 7,694,141 B2 | 4/2010 | Lauter et al. | |
| 7,844,834 B2 | 11/2010 | Leone et al. | |
| 8,572,386 B2 | 10/2013 | Takekawa et al. | |
| 9,178,868 B1 | 11/2015 | Leung et al. | |
| 9,271,110 B1 | 2/2016 | Fultz et al. | |
| 9,565,178 B2 | 2/2017 | Sondhi et al. | |
| 9,660,986 B2 | 5/2017 | Chou | |
| 9,906,525 B1 | 2/2018 | Avetisov et al. | |
| 9,930,034 B2 | 3/2018 | Ekambaram et al. | |
| 10,331,471 B1* | 6/2019 | Viktorov | G06F 9/45558 |
| 10,476,879 B2* | 11/2019 | Bathen | H04L 63/0838 |
| 10,853,108 B2* | 12/2020 | Chandaria | G06F 8/31 |
| 2002/0062451 A1 | 5/2002 | Scheidt et al. | |
| 2003/0154406 A1* | 8/2003 | Honarvar | G06Q 20/4014 726/10 |
| 2005/0198652 A1* | 9/2005 | Huscher | G06F 9/44505 719/331 |
| 2011/0154464 A1* | 6/2011 | Agarwal | H04L 63/0815 726/8 |
| 2013/0144755 A1 | 6/2013 | Mowatt et al. | |
| 2014/0372972 A1* | 12/2014 | Chandaria | H04L 63/08 717/106 |
| 2015/0089585 A1* | 3/2015 | Novack | H04L 63/1433 726/3 |
| 2015/0146246 A1* | 5/2015 | Ito | H04N 1/32144 358/1.15 |
| 2016/0027009 A1* | 1/2016 | Sivashanmugam | H04L 63/083 705/21 |
| 2017/0085381 A1 | 3/2017 | Richardson | |
| 2017/0148074 A1* | 5/2017 | Douglas | G06Q 30/0609 |
| 2017/0364920 A1* | 12/2017 | Anand | H04L 63/0861 |
| 2018/0060496 A1 | 3/2018 | Bulleit et al. | |
| 2018/0114003 A1 | 4/2018 | Uenishi | |
| 2018/0115554 A1 | 4/2018 | Dyon et al. | |
| 2018/0232526 A1 | 8/2018 | Reid et al. | |
| 2018/0241558 A1* | 8/2018 | Takahashi | G06F 16/951 |
| 2020/0213128 A1* | 7/2020 | Sharma | H04L 9/0643 |

FOREIGN PATENT DOCUMENTS

| | | | | |
|---|---|---|---|---|
| JP | 2000-010927 A | | 1/2000 | |
| WO | WO 2016/128568 A1 | | 8/2016 | |
| WO | WO-2017143822 A1 | * | 8/2017 | G06F 3/0482 |
| WO | WO 2018/032372 A1 | | 2/2018 | |
| WO | WO 2018/112946 A1 | | 6/2018 | |

OTHER PUBLICATIONS

Oprea et al.; "Securing a Remote Terminal Application with a Mobile Trusted Device"; IEEE 20th Annual Computer Security Application Conf.; 2004; p. 438-447.

Vila et al.; "The Token Reification Approach to Temporal Reasoning"; Artificial Intelligence; vol. 83; May 1996; 20 pages.

M'Raihi et al.; "HTOP: An HMAC-Based One-Time Password Algorithm"; Network Working Group; RFC 4226; Dec. 2005; 37 pages.

Richta et al.; "Dynamic Software Architecture for Distributed Embedded Control Systems"; PNSE Petri Nets; 2015; p. 133-150.

Petr Hanacek; "Security of Smartcard Based Payment Protocol"; Technical University; 8 pages.

* cited by examiner

AUTHENTICATION FOR FUNCTIONS AS A SERVICE

BACKGROUND

In traditional networks, authentication functions are handled by a firewall. While firewall authentication technology can offer robust protection, updating or changing authentication settings at the firewall can be costly, both in terms of ramp-up time and developer effort. These limitations frustrate the purpose of serverless architectures and other cloud computing methodologies, particularly in instances where authentication needs are specific to a particular microservice, or even are specific to a particular instantiation thereof.

Further, applications built for serverless architectures may contain dozens—or even hundreds—of serverless functions, each with a specific purpose. These functions may connect together to form overall system logic, but some of these functions may expose public web application programming interfaces (APIs), while others may consume events from different source types. Yet others may have coding issues ripe for exploit and attacks, which lead to unauthorized authentication.

Thus, there is a need to develop authentication technology that aligns more with virtualized environments and serverless architectures.

SUMMARY

The disclosed systems, methods, and apparatuses allow for authentication to facilitate development and use of virtualized environments, serverless architectures, and functions as a service ("FaaS").

In an aspect, this disclosure is directed to a method. The method may include receiving computer code at a machine-learning algorithm. Compiling the computer code may create a software unit. The method may include parsing, by the machine-learning algorithm, the computer code to extract an authenticating parameter. The method may include constructing, by the machine-learning algorithm, an authentication template based on the authenticating parameter and providing the authentication template to a user. The method may also include receiving input from the user, the input including a user modification of the authentication template. The method may include creating an authentication microservice based on the user modification and the authentication template and linking the authentication microservice to the software unit to deploy the authentication microservice within the software unit. The authentication microservice controls access to at least a portion of the software unit. The method may further include modifying the machine-learning algorithm based on the user modification.

In another aspect, this disclosure is directed to a method. The method may include receiving code at a machine-learning algorithm, the code indicative of a software unit and parsing, by the machine-learning algorithm, the code to extract an authenticating parameter. The method may include constructing, by the machine-learning algorithm, an authentication template based on the authenticating parameter and providing the authentication template to a user. The method may also include receiving a user input from the user responsive to the authentication template. The method may include creating an authentication microservice based on the authentication template and linking the authentication microservice to the software unit to deploy the authentication microservice within the software unit. The method may further include modifying the machine-learning algorithm based on the user input.

According to another aspect, this disclosure is directed to a system. The system may include a processor and memory storing instructions that cause the processor to effectuate operations. The operations may include receiving code indicative of a software unit and parsing the code to extract an authenticating parameter. The operations may also include constructing an authentication template based on the authenticating parameter and providing the authentication template to a user. The operations may include receiving input from the user responsive to the authentication template. The operation may also include creating an authentication microservice based on the authentication template and linking the authentication microservice to the software unit to deploy the authentication microservice within the software unit. The operations may include modifying the machine-learning algorithm based on the user input.

BRIEF DESCRIPTION OF THE DRAWINGS

Aspects of the herein authentication technology are described more fully herein with reference to the accompanying drawings, in which example embodiments are shown. In the following description, for purposes of explanation, numerous specific details are set forth in order to provide an understanding of the various embodiments. However, the instant disclosure may be embodied in many different forms and should not be construed as limited to the example embodiments set forth herein. Where convenient, like numbers refer to like elements.

DETAILED DESCRIPTION

Authentication may be a challenge in serverless architectures and, more specifically, FaaS architectures. For example, each node may require a different set of authentication mechanisms or requirements, such as different digital certificates, usernames or passwords. Further, these nodes may be short-lived. For example, once a transaction is complete, nodes may self-destruct. Such nodes can rebuild (spin-up) in response to a need to process another transaction.

Figure 1:
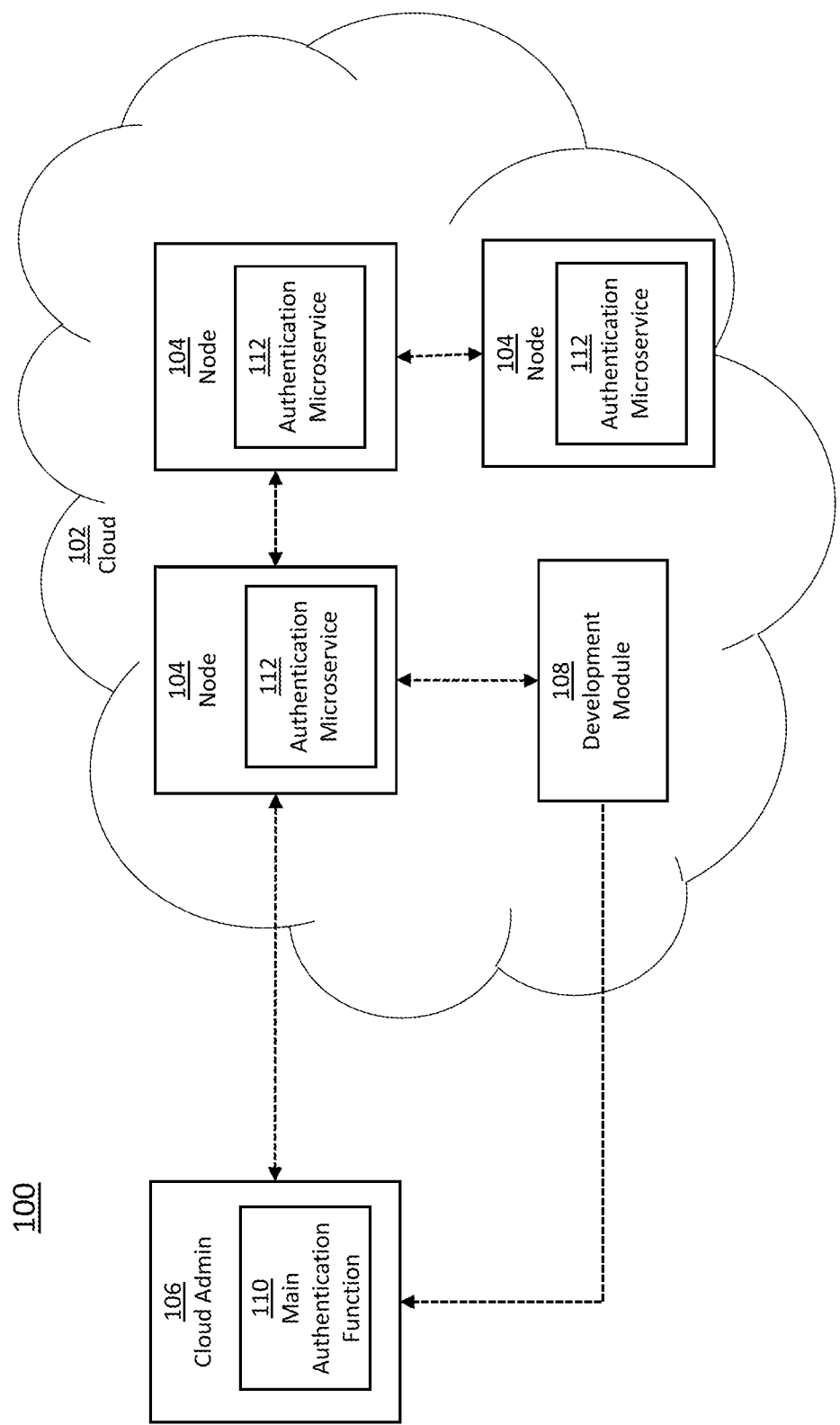
FIG. 1 is a schematic of a virtualized system for cloud computing in which authentication microservices can be incorporated.

FIG. 1 is a high-level schematic of a system 100 in which FaaS can deployed. System 100 includes additional functionality for authentication procedures related to FaaS deployment and use. Generally, system 100 may include a cloud environment 102 in which nodes 104 may operate. Environment 102 may be a public or private cloud. Environment 102 may have a serverless architecture, in which server management and low-level infrastructure decisions are handled by a cloud administrator 106. Such models may simplify the tasks of developers in creating and operating applications by handling allocation of resources at the cloud level rather than at the application level.

Each node 104 may be a unit of software functionality. For example, node 104 may be a virtual machine. A virtual machine may be a software implementation of a machine (e.g., a computer) that execute programs or functionality like a physical machine. Virtual machines can be isolated software containers, operating independent of other virtual machines. Such isolation can assist in realizing virtual-machine-based virtual environments that can execute applications and provide services with availability, flexibility, and security, in some cases, surpassing those on traditional, non-virtualized systems. Virtual machines can encapsulate a complete set of virtual hardware resources, including an operating system and all its applications, inside a software package. Encapsulation can make virtual machines quite portable and manageable. Indeed, virtual machines can be hardware-independent, and can be portably provisioned and deployed on one of multiple different computing devices, operating systems, and environments. Indeed, depending on the availability of computing devices within a cloud environment (e.g., environment 102) a particular virtual machine may be provisioned on any one (or multiple) of the devices included in cloud environment 102.

Additionally or alternatively, node 104 may be a smaller software unit, such as an application, a microservice, or, even smaller, a virtual function, such as an FaaS. These nodes 104 may be modular functions that can execute and scale independently within environment 102. Multiple FaaSes (e.g. nodes 104) may form a microservice, and multiple microservices may form an application. In FaaS models, node 104 may be more responsive to changes in demand, spinning up and destructing dynamically.

While FaaS provides advantages—simpler development and more dynamic resource allocation—difficulties may arise both in development and operation of authentication with respect to those nodes 104. Different nodes 104 may have different authentication requirements. These requirements are historically handled at a firewall. But firewall-based authentication can be slow to create and modify, as such authentication models are centrally based. For developers and operators to fully enjoy the speed and dynamic nature of FaaS, authentication should be handled on a node-level, such as by each FaaS, or each virtual machine. System 100 provides the functionality to do so.

System 100 may include a development module 108 through which developers can interface with system 100 to design and deploy nodes 104. Development module 108 may interface with cloud administrator 106 to facilitate software development. Specifically, development module 108 may include functionality to facilitate development of authentication processes in conjunction with development of the associated software nodes 104. Development module 108 may interface with a main authentication function 110 that controls or monitors authentication for cloud 102. This main authentication function 110 may coordinate with authentication microservices 112 that are embedded in each node 104. Thus, to handle authentication for node 104, the developer creating node 104 develops embedded authentication microservice 112 in conjunction with development of its corresponding node 104. Each embedded authentication microservice 112 is designed to spin-up and self-destruct along with its corresponding node 104.

Figure 2:
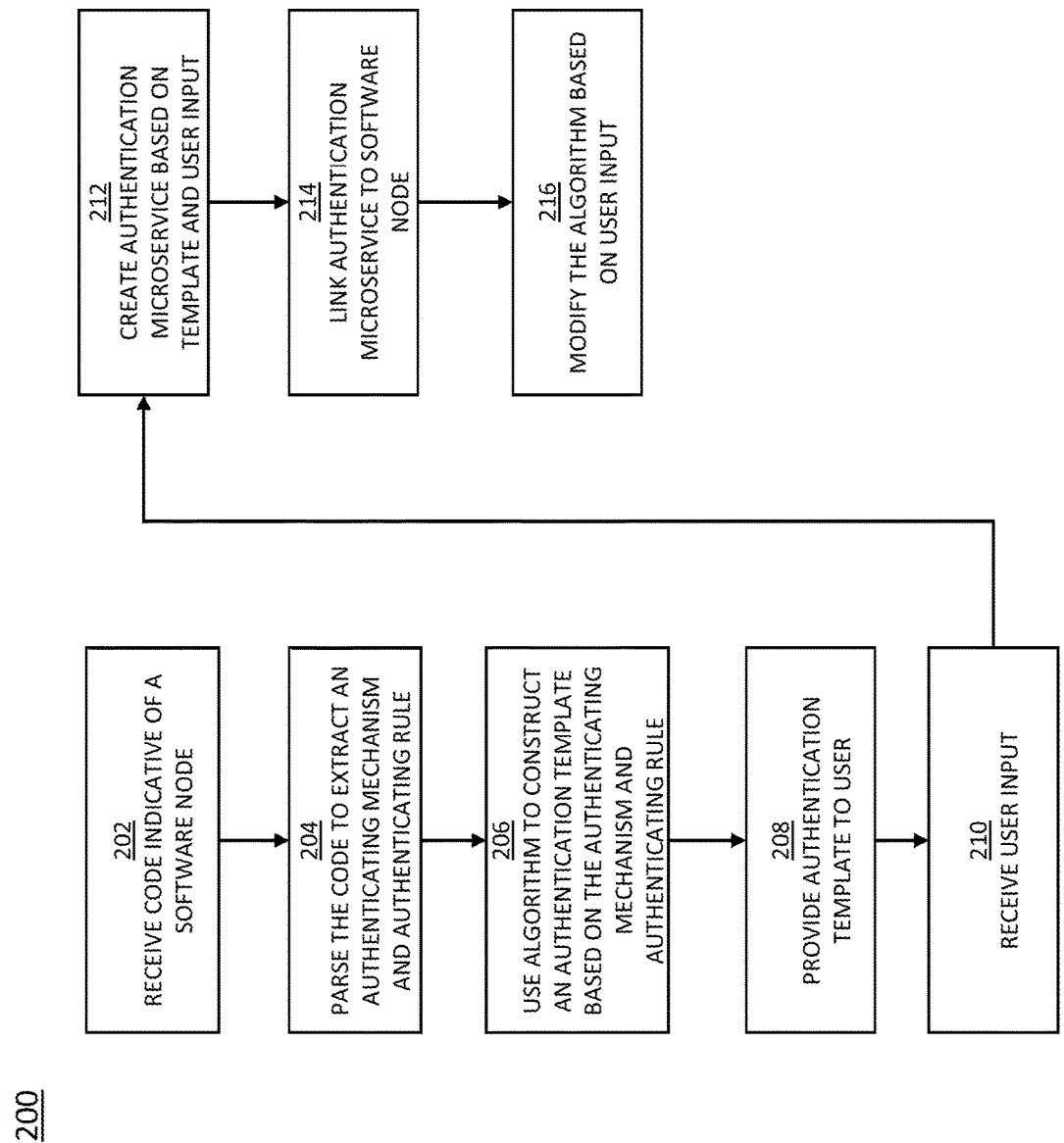
FIG. 2 is a flowchart of an exemplary method of operating a machine learning algorithm for deploying authentication microservices.
Figure 3:
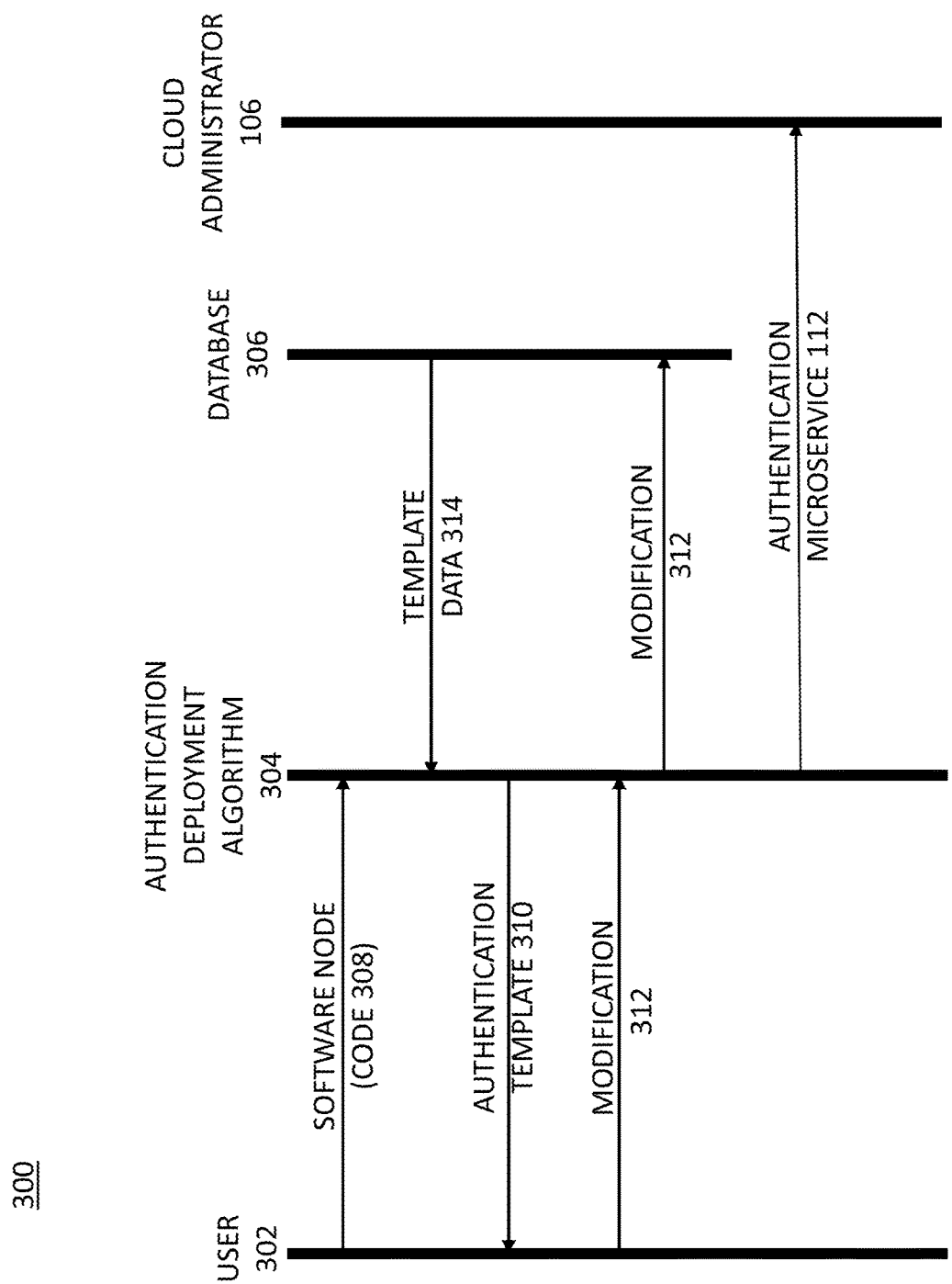
FIG. 3 is a dataflow of an exemplary authentication deployment algorithm.

FIG. 2 illustrates a method 200 by which developer module 108 uses an authentication deployment algorithm ("the algorithm") to facilitate development of authentication functions related to a particular node 104. FIG. 3 illustrates the data transfer among the developer (user 302), the algorithm 304, the algorithm database 306, and cloud administrator 106. In the following, reference is made to both FIGS. 2 and 3 to illustrate development and deployment of authentication microservices.

Each node 104 is comprised of code 308. This code 308 may be in the same or substantially the same form as written by a developer (user 302), or it may be code 308 generated in response to input from the developer (user 302). This code 308 may be in any form known to form software, such as, but not limited to, source code, scripts, libraries, executable code, compiled code, binary code, or any other form.

At step 202, code 308 indicative of node 104 is input into algorithm 304 of developer module 108. For example, this code may be received via development module 108. At step 204, the algorithm may parse code 308 to extract or otherwise identify the authenticating parameter for node 104 associated with code 308.

The authenticating parameter may include one or more mechanisms or rules for authenticating access or use of node 104. For example, such authenticating mechanisms may specify how an end user gains access to node 104, the realm in which the end user will be authenticating, constraints on access, or additional attributes. Such authentication mechanisms may include HTTP basic authentication, form-based authentication, digest authentication, client authentication, or mutual authentication.

The authentication mechanism may be identifiable based on the source code (e.g., code 308). For example, in Java, the login-config element specifies the authenticating mechanism. Thus, in this example, at step 204, the algorithm may parse code 308 to identify the login-config element and extract code associated therewith, including sub-elements auth-method, realm-name, and form-login-config. Of course, other elements in code 308 may be identified and extracted at step 204. In programmatic authentication, parsing of code 308 may be based on the HttpServletRequest interface methods authenticate, login, and logout. For other code, including non-Java code, similar or different elements may be pertinent to identifying the authentication mechanism.

Similarly, the authentication rule may be identifiable based on the source code (e.g., code 308). Authentication rules may define access privileges to node 104. These authentication rules may specify the roles, end-user groups, or specific end users authorized to perform certain requests, specify how data is to be protected, particularly during transmissions between node 104 and an end user, and what resources of node 104 have which constraints on use, access, or modification. For example, in Java, the security-constraint element may impose an authentication rule. For other code, including non-Java code, similar or different elements may be pertinent to identifying the authentication rules associated with node 104.

At step 206, algorithm 304 assists in development of authentication microservice 112 through the creation of an authentication template 310. At a basic level, algorithm 304 creates authentication template 310 based on the authentication parameters extracted from code 308. Algorithm 304 may be a machine-learning algorithm, and may thus adapt through the repeated use of algorithm 304, as discussed below with respect to step 214.

Creating template 310 may include determining what is needed to authenticate connections to node 104 (e.g., username and password, digital certificates, multifactor authentication). These determinations may be based on code 308 and other template data 314, such as data 314 received from a database 306 accessible by authentication deployment algorithm 304.

Template 310 may comprise code or other forms that user 302 may modify consistent with the requirements or operability of node 104. At step 208, template 310 is provided to user 302. Template 310 may be operable to allow user 302 to approve, modify, or reject the authentication function indicated by template 310. For example, template 310 may comprise a graphical user interface designed to receive inputs from user 302 through the use of dropdown boxes, modular boxes, selectable user interface elements, or the like. Additionally or alternatively, template 310 may comprise authentication code that, once compiled and/or executed, is operable to perform an authentication function. This code may be user-editable, so that the developer may complete or correct template 310. At step 208, authentication template 310 may be provided to user 302. User 302 may review and modify authentication template 310 to satisfy the design or operation requirements (or user preferences) regarding authentication of node 104.

At step 210, user 302 may provide an input, such as a modification 312, responsive to template 310. The input may include an approval of template 310, indicating that the authentication functionality proposed by algorithm 304 needs no changes. The input may include an outright denial of template 310. This could include user 302 providing (e.g., writing or uploading) code for authentication microservice 112. The third option is that the input may result in user 302 changing less than all of template 310—a template modification 312. These modifications may include any changes to template 310, such as removal, addition, or change of an authentication parameter. This could include changing access restrictions for certain roles, changing authentication information to be requested from the end user, or any other known authentication requirement. Additionally or alternatively, modifications 312 can control processes between node 104 and main authentication function 110. For example, this could include changing the methods of communications therebetween, how long authentication information is ripe until it expires and needs reauthentication, or other limitations.

At step 212, algorithm 304 may create authentication microservice 112 based on template 310 and user input, such as modification 312. This could include compiling code based on template 310, such as in instances where user input approves of template 310 wholesale. This could include incorporating modifications 312 indicated by user input into the code indicated by authentication template 310. In some embodiments, such modifications 312 are reflected in the user-input code modifying the code presented to user 302 in authentication template 310. This resulting code may be indicative of authentication microservice 112. For example, this resulting code may be compiled (or otherwise processed) to create authentication microservice 112.

At step 214, authentication microservice 112 may be linked to software node 104. This may include embedding microservice 112 in software node 104. For example, authentication microservice 112 may have a particular role based on the identity of software node 104 within which it is embedded. Authentication microservice 112 may enforce authentication specific to its particular node 104. Authentication microservice 112 may work separately from software node 104, though such operation may cooperate with software node 104.

At step 216, algorithm 304 may be modified based on information gathered from the user input received at step 210. Algorithm 304 for creating and linking authentication microservices 112 to their respective software nodes 104 may be a machine-learning algorithm that adapts over time. In practice, algorithm 304 may increase its precision and thus decrease the user input from developers to create authentication microservices 112 for software nodes 104.

For example, patterns in modifications 312 may inform future templates 310. These patterns may be correlated to the identity of user 302, the purpose of software nodes 104, specific content with code 308, or any combination thereof. These patterns and other data may be collected by algorithm 304 and stored in database 306 as template data 314.

For example, a pattern associated with a particular user 302 may reflect that developer's authentication style or preferences. Thus, when that user 302 develops a new node 104, algorithm 304 may factor in that user's preferences when weighing options for authentication templates 310 to present to that user 302. Thus, algorithm 304 may correlate node 104 or code 308, along with the identity of user 302, with template data 314 retrieved from database 306 to affect the formation of template 310.

Algorithm 304 may facilitate deployment of node 104 and authentication microservice 112 in environment 102. For example, this may be accomplished because algorithm 304 may be contained within or communicate with cloud administrator 106.

As templates 310 may be informed by not only code 308, but also other factors including previously implemented authentication microservices 112, authentication deployment algorithm 304 may select template 310 from multiple available options. Algorithm 304 dynamically adapts responsive to patterns in data collected from earlier deployments of authentication microservices 112. Thus, algorithm 304 may identify one or more options that have a minimum likelihood of satisfying authentication requirements for certain categories of software nodes 104 (and users 302). Thus, algorithm 304 may associate a probability with certain options. The selection of a particular option to present as authentication template 310 may be based on weighing various options. Thus, when algorithm 304 presents one option as template 310 responsive to user 302 and/or code 308, and user 302 modifies template 310 to ultimately result in a different option, the weight afforded to the presented option may be lowered, while the weight afforded to the modified option may be increased, for future transactions. In this manner, algorithm 304 learns from and adapts to subsequent requests for authentication microservices 112. The same adaptability may be achieved from templates 310 that expressly present user 302 with multiple alternatives for authentication microservice 112.

Returning to FIG. 1, each authentication microservice 112 may be designed to communicate with other (related) authentication microservices 112. For example, authentication microservices 112 of nodes 104 that interact with one another may themselves communicate to facilitate authenticated transmissions between nodes 104. That is, authentication microservices 112 may communicate with one another, directly or through main authentication function 110. As authentication microservices 112 spin up and self-destruct along with their respective nodes 104, communication directly with main authentication function 110 may provide a comprehensive authentication infrastructure for cloud computing.

Authentication between microservices 112 and between any microservices 112 and main authentication function 110 may be made further secure using blockchain technology. As different interfaces (e.g., between end users and nodes 104, between two nodes 104, and between nodes 104 and cloud administrator 106) are authenticated, by authentication microservices 112, main authentication function 110, or a combination thereof, blockchain technology may be used to record these transactions. Such blockchain records may be used to expedite future authenticating functions, such as between the same nodes 104. Particularly as authentication microservices 112 are destroyed along with their associated nodes 104, blockchain ledgers may provide a distributed, reliable record of authenticating transactions.

What is claimed:

1. A method implemented by a processing system comprising a processor and operating system, the method comprising steps executed by the processor including:
    receiving computer code at a machine- learning algorithm,
    wherein the computer code was written by a user using a programming language and has not been compiled;
    before runtime, compiling the computer code using a compiler that generates executable compiled code for execution at the runtime within a software unit that operates in a computing environment, comprising a cloud computing environment, by execution of the executable complied code by a combination of the operating system and the processor;
    parsing, using the machine-learning algorithm, the computer code to extract an authenticating parameter including one or more rules for authenticating access to the software unit;
    constructing, using the machine-learning algorithm, an authentication template based on the authenticating parameter;
    providing the authentication template to the user at least in part in accordance with a first pattern associated with the user indicative of the user's authentication style or preferences;
    receiving user input from the user, the user input including a user modification of the authentication template thereby yielding information comprising authentication factors that are required for authenticating the access to the software unit;
    creating an authentication microservice based on the user modification, the authentication template, the authentication parameter, and the information;
    before the runtime, linking, by the machine learning algorithm the authentication microservice to the software unit to deploy the authentication microservice within the software unit in a deployment procedure by embedding the authentication microservice into the software unit such that when an instance of software unit is created or destroyed, a portion of the instance corresponding to the authentication microservice is also correspondingly created or destroyed,
    wherein the authentication microservice controls access to at least a portion of the software unit at the runtime;
    modifying the machine-learning algorithm based on the user modification and in accordance with a second pattern in data collected in previous deployment procedures;
    determining a pattern in the user modification and one or more additional modifications; and
    correlating the pattern to an identity of the user and to the preferences of the user.

2. The method of claim 1, wherein the software unit comprises a function as a service.

3. The method of claim 1, wherein the software unit comprises a virtual machine.

4. The method of claim 1, wherein the authentication parameter comprises at least one authenticating mechanism and at least one authenticating rule.

5. The method of claim 4 wherein the authentication mechanism comprises dual authentication.

6. The method of claim 1, wherein the authentication template comprises a plurality of options and the user input is indicative of a selection of one of the plurality of options.

7. The method of claim 6, wherein the modifying the machine-learning algorithm comprises weighting the selection greater than a second option of the plurality of options.

8. A system comprising: a processing system including a processor and an operating system; and a memory storing executable instructions that, when executed by the processing system, cause the processor to perform operations of a machine-learning algorithm, the operations comprising:
    receiving computer code at a machine- learning algorithm,
    wherein the computer code was written by a user using a programming language and has not been compiled;
    before runtime, compiling the computer code using a compiler that generates executable compiled code for execution at the runtime within a software unit that operates in a computing environment, comprising a cloud computing environment, by execution of the executable complied code by a combination of the operating system and the processor;
    parsing, using the machine-learning algorithm, the computer code to extract an authenticating parameter including one or more rules for authenticating access to the software unit;
    constructing, using the machine-learning algorithm, an authentication template based on the authenticating parameter;
    providing the authentication template to the user at least in part in accordance with a first pattern associated with the user indicative of the user's authentication style or preferences;
    receiving user input from the user, the user input including a user modification of the authentication template thereby yielding information comprising authentication factors that are required for authenticating the access to the software unit;
    creating an authentication microservice based on the user modification, the authentication template, the authentication parameter, and the information;
    before the runtime, linking, by the machine learning algorithm the authentication microservice to the software unit to deploy the authentication microservice within the software unit in a deployment procedure by embedding the authentication microservice into the software unit such that when an instance of software unit is created or destroyed, a portion of the instance corresponding to the authentication microservice is also correspondingly created or destroyed,
    wherein the authentication microservice controls access to at least a portion of the software unit at the runtime;
    modifying the machine-learning algorithm based on the user modification and in accordance with a second pattern in data collected in previous deployment procedures;
    determining a pattern in the user modification and one or more additional modifications; and correlating the pattern to an identity of the user and to the preferences of the user.

9. The system of claim 8, wherein the correlating comprises correlating the pattern to a purpose of an associated software node, wherein each instantiation of the software node comprises a respective instantiation of the authentication microservice.

10. The system of claim 8, wherein the correlating comprises correlating the pattern to a purpose of an associated software node, wherein the software node comprises a function as a service.

11. The system of claim 8, wherein the correlating comprises correlating the pattern to a purpose of an associated software node, wherein the software node comprises a virtual machine.

12. The system of claim 8, wherein the correlating comprises correlating the pattern to a purpose of an associated software node, wherein the software node is deployable within a cloud environment.

13. The system of claim 12, wherein the operations further comprise recording an authentication between the authentication microservice and a main authentication function associated with an administrator of the cloud environment.

\* \* \* \* \*